United States Patent
Zhao et al.

(10) Patent No.: US 12,490,285 B2
(45) Date of Patent: Dec. 2, 2025

(54) METHOD AND APPARATUS FOR IDENTIFYING REDUCED CAPABILITY USER EQUIPMENT TYPE, BASE STATION, AND USER EQUIPMENT

(71) Applicant: SPREADTRUM COMMUNICATIONS (SHANGHAI) CO., LTD., Shanghai (CN)

(72) Inventors: Sicong Zhao, Shanghai (CN); Zhenzhu Lei, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 371 days.

(21) Appl. No.: 18/261,491

(22) PCT Filed: Feb. 16, 2022

(86) PCT No.: PCT/CN2022/076438
§ 371 (c)(1),
(2) Date: Jul. 14, 2023

(87) PCT Pub. No.: WO2022/152327
PCT Pub. Date: Jul. 21, 2022

(65) Prior Publication Data
US 2024/0314823 A1    Sep. 19, 2024

(30) Foreign Application Priority Data

Jan. 15, 2021 (CN) .......................... 202110055598.4

(51) Int. Cl.
*H04W 72/51* (2023.01)

(52) U.S. Cl.
CPC .................................. *H04W 72/51* (2023.01)

(58) Field of Classification Search
CPC ....................................................... H04W 72/12
(Continued)

(56) References Cited

U.S. PATENT DOCUMENTS

2023/0422296 A1    12/2023    Feng et al.

FOREIGN PATENT DOCUMENTS

| CN | 109076617 A | 12/2018 |
| CN | 111567126 A | 8/2020 |
| CN | 111919490 A | 11/2020 |

OTHER PUBLICATIONS

Chinese Office Action mailed Feb. 25, 2025, issued in related Chinese Application No. 202110055598.4, 20 pages.
(Continued)

*Primary Examiner* — Angel T Brockman
(74) *Attorney, Agent, or Firm* — Wiersch Law Group (57) ABSTRACT

A method and an apparatus for identifying a reduced capability (RedCap) user equipment (UE) type, a base station, and a UE. The method includes broadcasting random access channel (RACH) configuration information, comprising a proportion parameter of available RACH occasion (RO) resources for different RedCap UE types, of RedCap UEs in a cell through a broadcast message in such a manner that a RedCap UE of the RedCap UEs is configured to transmit, based on the proportion parameter and a RedCap UE type of the different RedCap UE types, Msg1 to a base station by using RO resources corresponding to the RedCap UE type; and identifying the RedCap UE type of the RedCap UE based on the RO resources used by the RedCap UE to transmit the Msg1.

18 Claims, 4 Drawing Sheets

Broadcast random access channel (RACH) configuration information, including a proportion parameter of available RACH occasion (RO) resources for different RedCap UE types, of RedCap UEs in a cell through a broadcast message in such a manner that a RedCap UE of the RedCap UEs is configured to transmit, based on the proportion parameter and a RedCap UE type of the different RedCap UE types, Msg1 to a base station by using RO resources corresponding to the RedCap UE type — 101

Identify the RedCap UE type of the RedCap UE based on the RO resources used by the RedCap UE to transmit the Msg1 — 102

(58) Field of Classification Search
USPC .......................................................... 370/329
See application file for complete search history.

(56) References Cited

OTHER PUBLICATIONS

Identification and access restriction for RedCap UEs.
On identification of and access control for RedCap UEs.
Identification and access restriction for devices with reduced capabilities.
Device type definition and how to signal the device type to network.
International Search Report (PCT/CN2022/076438); Date of Mailing: Apr. 22, 2022.
Discussion-on-identification-of-reduced-capability-UE.
Discussion-on-the-access-control-and-configuration-for-reduced-capability-device.
Initial-access-for-RedCap-UEs.

Transmit, based on random access channel (RACH) configuration information of RedCap UEs in a cell broadcast by the base station and including a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1 — 201

METHOD AND APPARATUS FOR IDENTIFYING REDUCED CAPABILITY USER EQUIPMENT TYPE, BASE STATION, AND USER EQUIPMENT

CROSS-REFERENCE TO RELATED APPLICATIONS

The present application is a national stage of International Application No. PCT/CN2022/076438, filed on Feb. 16, 2022, which claims priority to Chinese Patent Application No. 202110055598.4, filed on Jan. 15, 2021. All of the aforementioned applications are the content of which is incorporated herein by reference in its entirety their entireties.

TECHNICAL FIELD

The present disclosure relates to the technical field of wireless communication, and in particular, to a method and an apparatus for identifying a reduced capability (RedCap) user equipment (UE) type, a base station, and a UE.

BACKGROUND

In the 3rd Generation Partnership Project (3GPP), when RedCap UEs and non-RedCap UEs access the same cell network, a base station (gNodeB, gNB for short) can identify whether a UE is a RedCap UE or a non-RedCap UE through Msg1, Msg3, Msg5, or UE capability reporting. One feasible solution to identify a RedCap UE and a non-RedCap UE through Msg1 is to use different random access channel occasion (RACH Occasion, RO for shot) resources for the RedCap UE and non-RedCap UE. Non-RedCap UEs include an Enhanced Mobile Broadband (eMBB) UE and an Ultra-Reliable Low Latency Communications User Equipment (URLLC UE).

Currently, the 3GPP is also discussing whether to define one type or two types of RedCap UEs. If two types of RedCap UEs are defined, the gNB may need to identify which type of a RedCap UE it is during an initial access phase. This is because the capabilities of the two types of RedCap UE are different. For example, one type of the RedCap UE may have a single downlink antenna, while the other type of the RedCap UE may have two downlink antennas.

However, there is currently no method in the related art that can identify a RedCap UE type of a RedCap UE.

SUMMARY

In view of the above, embodiments of the present disclosure provide a method and an apparatus for identifying a RedCap UE type, a base station, and a UE. By introducing a proportion parameter, available RO resources for different types of RedCap UEs can be determined. The RedCap UE type is then identified according to the RO resources used by the RedCap UE.

According to a first aspect, the embodiments of the present disclosure provide a method for identifying a reduced capability (RedCap) user equipment (UE) type, and the method includes: broadcasting random access channel (RACH) configuration information, comprising a proportion parameter of available RACH occasion (RO) resources for different RedCap UE types, of RedCap UEs in a cell through a broadcast message in such a manner that a RedCap UE of the RedCap UEs is configured to transmit, based on the proportion parameter and a RedCap UE type of the different RedCap UE types, Msg1 to a base station by using RO resources corresponding to the RedCap UE type; and identifying the RedCap UE type of the RedCap UE based on the RO resources used by the RedCap UE to transmit the Msg1.

In some embodiments, the different RedCap UE types of RedCap UEs include a first-type RedCap UE and a second-type RedCap UE.

In some embodiments, a proportion of RO resources used by a first-type RedCap UE is M/KQ; and a proportion of RO resources used by a second-type RedCap UE is (KQ−M)/KQ, where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠Q, and n is a positive integer.

In some embodiments, the RO resources are allocated to the RedCap UEs based on the proportion parameter in a first mapping manner or a second mapping manner.

In some embodiments, the first mapping manner includes a continuous mapping which is in units of the K association periods, the first-type RedCap UE uses first M ROs of the KQ ROs corresponding to each SSB, and the second-type RedCap UE uses (M+1)-th to KQ-th ROs of the KQ ROs corresponding to each SSB.

In some embodiments, the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner; in a case where M is smaller than or equal to Q/2, the index of the RO corresponding to each SSBx that is used by the first-type RedCap UE satisfies y mod k=0, and k=⌈Q/M⌉; and in a case where M is greater than Q/2, the index of the RO corresponding to each SSBx that is used by the second-type RedCap UE satisfies y mod k=0, and k=⌈K*Q/(K*Q−M)⌉.

According to a second aspect, some embodiments of the present disclosure provide a method for identifying a reduced capability (RedCap) user equipment (UE) type, and the method includes: transmitting, based on random access channel (RACH) configuration information of RedCap UEs in a cell broadcast by the base station and comprising a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1.

In some embodiments, the different RedCap UE types of RedCap UEs include a first-type RedCap UE and a second-type RedCap UE.

In some embodiments, a proportion of RO resources used by a first-type RedCap UE is M/KQ; and a proportion of RO resources used by a second-type RedCap UE is (KQ−M)/KQ, where M denotes the proportion parameter, Q denotes the number of ROs corresponding to each synchronization signal block (SSB) in an association period, KQ denotes the number of ROs corresponding to each SSB in K association periods, K=⌈M/Q⌉, M≠Q, and n is a positive integer.

In some embodiments, the RO resources are allocated to the RedCap UEs based on the proportion parameter in a first mapping manner or a second mapping manner.

In some embodiments, the first mapping manner includes a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

In some embodiments, the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner; in a case where M is smaller than or equal to Q/2, the index of the RO corresponding to each SSBx that is used by the first-type RedCap UE satisfies y mod k=0, and k=⌈Q/M⌉; and in a case where M is greater than Q/2, the index of the RO corresponding to each SSBx that is used by the second-type RedCap UE satisfies y mod k=0, and k=⌈K*Q/(K*Q−M)⌉.

According to a third aspect, some embodiments of the present disclosure provide an apparatus for identifying a reduced capability (RedCap) user equipment (UE) type, and the apparatus includes a broadcast module and an identification module. The broadcast module is configured to broadcast random access channel (RACH) configuration information, comprising a proportion parameter of available RACH occasion (RO) resources for different RedCap UE types, of RedCap UEs in a cell through a broadcast message in such a manner that a RedCap UE of the RedCap UEs is configured to transmit, based on the proportion parameter and a RedCap UE type of the different RedCap UE types, Msg1 to a base station by using RO resources corresponding to the RedCap UE type. The identification module is configured to identify the RedCap UE type of the RedCap UE based on the RO resources used by the RedCap UE to transmit the Msg1.

In some embodiments, the different RedCap UE types of RedCap UEs include a first-type RedCap UE and a second-type RedCap UE.

In some embodiments, a proportion of RO resources used by a first-type RedCap UE is M/KQ; and a proportion of RO resources used by a second-type RedCap UE is (KQ−M)/KQ, where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠nQ, and n is a positive integer.

In some embodiments, the RO resources are allocated to the RedCap UEs based on the proportion parameter in a first mapping manner or a second mapping manner.

In some embodiments, the first mapping manner includes a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

In some embodiments, the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner; in a case where M is smaller than or equal to Q/2, the index of the RO corresponding to each SSBx that is used by the first-type RedCap UE satisfies y mod k=0, and k=⌈Q/M⌉; and in a case where M is greater than Q/2, the index of the RO corresponding to each SSBx that is used by the second-type RedCap UE satisfies y mod k=0, and k=⌈K*Q/(K*Q−M)⌉.

According to a fourth aspect, some embodiments of the present disclosure provide an apparatus for identifying a reduced capability (RedCap) user equipment (UE) type, including a transmitting module.

The transmitting module is configured to transmit, based on random access channel (RACH) configuration information of RedCap UEs in a cell broadcast by the base station and comprising a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1.

In some embodiments, the different RedCap UE types of RedCap UEs include a first-type RedCap UE and a second-type RedCap UE.

In some embodiments, a proportion of RO resources used by a first-type RedCap UE is M/KQ; and a proportion of RO resources used by a second-type RedCap UE is (KQ−M)/KQ, where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠nQ, and n is a positive integer.

In some embodiments, the RO resources are allocated to the RedCap UEs based on the proportion parameter in a first mapping manner or a second mapping manner.

In some embodiments, the first mapping manner comprises a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

In some embodiments, the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner; in a case where M is smaller than or equal to Q/2, the index of the RO corresponding to each SSBx that is used by the first-type RedCap UE satisfies y mod k=0, and k=⌈Q/M⌉; and in a case where M is greater than Q/2, the index of the RO corresponding to each SSBx that is used by the second-type RedCap UE satisfies y mod k=0, and k=⌈K*Q/(K*Q−M)⌉.

According to a fifth aspect, some embodiments of the present disclosure provide a base station, including the apparatus for identifying the reduced capability (RedCap) user equipment (UE) type according to the third aspect.

According to a sixth aspect, some embodiments of the present disclosure provide a user equipment (UE), including the apparatus for identifying the reduced capability (RedCap) user equipment (UE) type according to the fourth aspect.

In the technical solutions of the method and the apparatus for identifying the RedCap UE type, the base station, and the UE provided by the embodiments of the present disclosure, the base station broadcasts random access channel (RACH) configuration information of RedCap UEs in a cell through a broadcast message. The RACH configuration information includes a proportion parameter of available RO resources for different RedCap UE types. The RedCap UE is configured to transmit, based on the proportion parameter and a RedCap UE type of the different RedCap UE types, Msg1 to the base station by using RO resources corresponding to the RedCap UE type. The base station identifies the RedCap UE type of the RedCap UE according to the RO resources used by the RedCap UE to transmit the Msg1. In the embodiments of the present disclosure, a proportion parameter is introduced to determine available RO resources for different types of RedCap UEs, and then the type of the RedCap UE is identified according to the RO resources used by the RedCap UE.

DESCRIPTION OF EMBODIMENTS

For a better understanding of the technical solutions of this application, the following describes in detail the embodiments of this application with reference to the accompanying drawings.

The described embodiments are merely some but not all of the embodiments of this application. All other embodiments obtained by a person of ordinary skill in the art based on the embodiments of this application shall fall within the scope of this application.

Terms in the embodiments of the present disclosure are merely used to describe the specific embodiments, and are not intended to limit the present disclosure. Unless otherwise specified in the context, words, such as "a", "the", and "said", in a singular form in the embodiments and appended claims of the present disclosure include plural forms.

It should be understood that the term "and/or" in this specification merely describes associations between associated objects, and it indicates three types of relationships. For example, A and/or B may indicate that A alone, A and B, or B alone. The character "/" in this specification generally indicates that the associated objects are in an "or" relationship.

In the related art, according to the current 3GPP protocol, a gNB configures time-domain resources of ROs by using a prach-ConfigurationIndex of a physical random access channel (PRACH), and configures frequency-domain resources of the ROs by using msg1-FDM and msg1-FrequencyStart. The three parameters, i.e., prach-ConfigurationIndex, msg1-FDM, and msg1-FrequencyStart, collectively determine the time-frequency resources of the ROs. Therefore, the most direct method to identify different UE types according to different RO resources is to allocate different RO resources to different types of UEs, that is, allocating different RO resources to different types of UEs by configuring different prach-ConfigurationIndex or msg1-FDM & msg1-FrequencyStart parameters.

Figure 1:
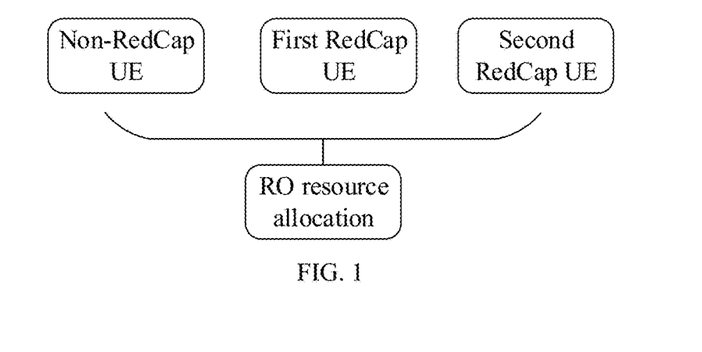
FIG. 1 is a schematic diagram of allocating different RO resources for different types of UEs.

UEs include non-RedCap UEs and two types of RedCap UEs. The two types of RedCap UEs are a first-type RedCap UE and a second-type RedCap UE, respectively. As shown in FIG. 1, each of the non-RedCap UE, the first-type RedCap UE, and the second-type RedCap UE is allocated one RO resource block. Due to the increased signaling overheads caused by allocating different RO resources to different types of UEs, some companies have expressed opposition to using Msg1 for identifying different UE types in 3GPP meetings.

Therefore, how to identify the RedCap UE type of a RedCap UE type has become an urgent technical problem that needs to be addressed.

Figure 2:
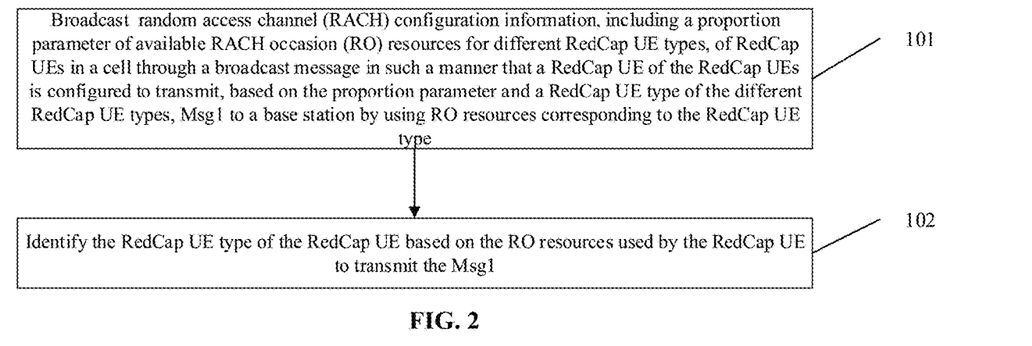
FIG. 2 is a flowchart of a method for identifying a RedCap UE type according to an embodiment of the present disclosure.

To solve the foregoing technical problem, the embodiments of the present disclosure provide a method and an apparatus for identifying a RedCap UE type, a base station, and a UE. FIG. 2 is a flowchart of a method for identifying a RedCap UE type according to an embodiment of the present disclosure. The method is applied to a base station. As shown in FIG. 2, the method includes steps 101 and 102.

At step 101, RACH configuration information, including a proportion parameter of available RO resources for different RedCap UEs types, of RedCap UEs in a cell is broadcast through a broadcast message in such a manner that a RedCap UE the RedCap UEs is configured to transmit, based on the proportion parameter and a RedCap UE type of the different RedCap UE types, Msg1 to a base station by using RO resources corresponding to the RedCap UE type.

In this embodiment of the present disclosure, the steps 101 and 102 are performed by a base station (gNB).

At this step, the gNB broadcasts RACH configuration information of RedCap UEs in the cell through system information broadcast (SIB).

It can be learned from the above that, the RACH configuration information includes prach-ConfigurationIndex, msg1-FDM, msg1-FrequencyStart, synchronization signal block (SSB) number, ssb-perRACH-Occasion, and the proportion parameter.

Prach-ConfigurationIndex determines a length of each RO period (PRACH period) and the number of ROs in the time domain. NT denotes the number of ROs in the time domain of each PRACH period.

The msg1-FDM and prach-ConfigurationIndex together determine the total number of ROs in each PRACH period. The total number of ROs in each PRACH period is msg1-FDM*NT.

The SSB number and ssb-perRACH-Occasion jointly determine the number of ROs required to map all the SSBs in one round, that is, SSB number/ssb-perRACH-Occasion. For example, if SSB number=4 and ssb-perRACH-Occasion=½, at least 8 ROs are required to map all the SSBs in one round. Ssb-perRACH-Occasion denotes the number of SSBs corresponding to each RO.

Figure 3:
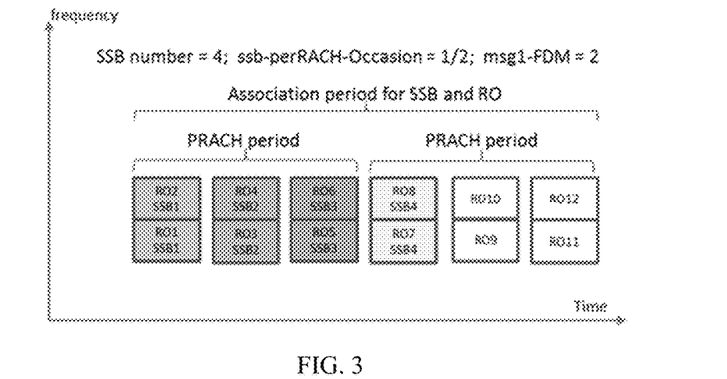
FIG. 3 is a schematic diagram of a mapping between synchronization signal blocks (SSBs) and Physical Random Access Channel (PRACH) occasions.

If SSB number/ssb-perRACH-Occasion is greater than msg1−FDM*NT, an association period includes a plurality of PRACH periods. For one of the SSBs, one association period corresponds to 1/ssb-perRACH-Occasion ROs. As shown in FIG. 3, one association period contains 2 PRACH periods, where SSB1 corresponds to two ROs: RO1 and RO2.

Figure 4:
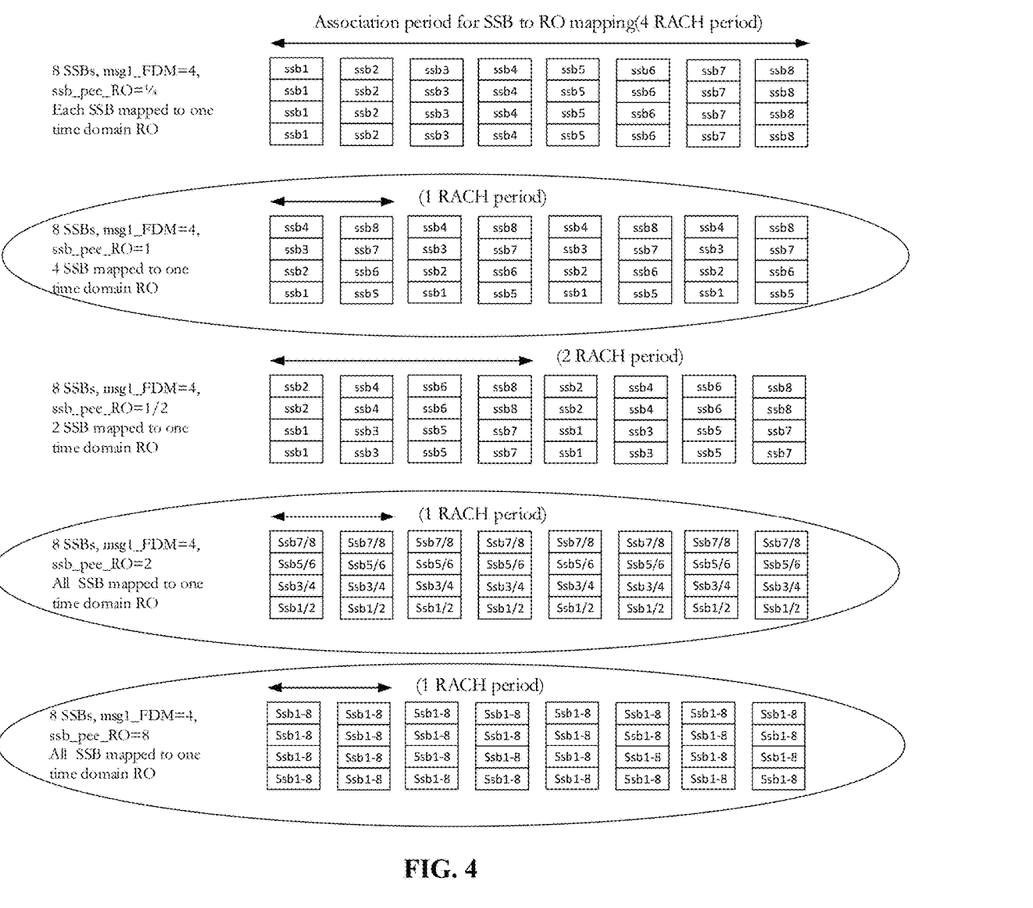
FIG. 4 is a schematic diagram of another mapping between SSBs and PRACH occasions.

If SSB number/ssb-perRACH-Occasion is less than or equal to msg1−FDM*NT, one PRACH period is considered as one association period, as shown in the example within the circle in FIG. 4.

In some embodiments of the present disclosure, the different RedCap UE types of RedCap UEs include a first-type RedCap UE and a second-type RedCap UE.

Figure 5:
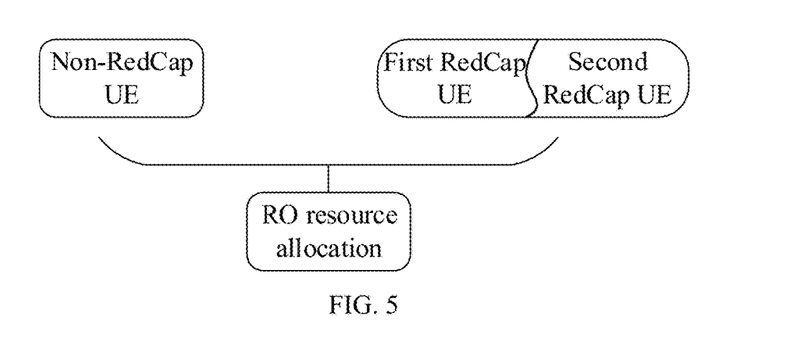
FIG. 5 is a schematic diagram of allocating RO resources for different types of UEs according to an embodiment of the present disclosure.

As shown in FIG. 5, the gNB allocates one block of RO resources for the non-RedCap UE and one block of RO resources for the two types of RedCap UEs. A proportion parameter is introduced to indicate the ratio of RO resources available for the first-type RedCap UE and the second-type RedCap UE, which helps to save signaling overheads. A proportion of RO resources used by the first-type RedCap UE is calculated by dividing the proportion parameter by the number of RO resources corresponding to each SSB. A proportion of RO resources used by the second-type RedCap UE is calculated as 1 minus the proportion of RO resources occupied by the first-type RedCap UE.

For example, if the proportion parameter is M and the number of RO resources corresponding to each SSB in one association period is Q, the number of RO resources corresponding to each SSB in K association periods is KQ. In this case, (K−1)Q<M≤KQ, where K and Q are natural numbers. Therefore, the proportion of RO resources used by the first-type RedCap UE is the proportion parameter M divided by the number of RO resources KQ corresponding to each SSB, that is, the proportion is M/KQ. The proportion of RO resources used by the second-type RedCap UE is 1 minus the proportion of RO resources occupied by the first-type RedCap UE, that is, (KQ−M)/KQ. K=⌈M/Q⌉, and M≠nQ, where n is a positive integer. ⌈M/Q⌉ denotes rounding up M/Q to the nearest integer. In other words, if M/Q is an integer, K=M/Q; otherwise, K is equal to the integer part of M/Q plus 1.

Regardless of the configuration, each SSB corresponds to several ROs in one association period. It is assumed that each SSB corresponds to Q ROs in one association period. For ROs available to different types of RedCap UEs, KQ ROs corresponding to each SSB in K association periods are numbered in a frequency-domain-first, time-domain-second manner. Then, there are two mapping manners:

The first mapping manner is a continuous mapping which is in units of the K association periods, the first-type RedCap UE uses first M ROs of the KQ ROs corresponding to each SSB, and the second-type RedCap UE uses (M+1)-th to KQ-th ROs of the KQ ROs corresponding to each SSB.

The second mapping manner is a discontinuous mapping which is in units of K association periods, SSBx #y denotes the y-th RO corresponding to the x-th SSB, y is an index of the RO corresponding to SSBx, y=0, 1 . . . , K*Q−1, and y is numbered in a frequency-domain-first, time-domain-second manner. When M is less than or equal to Q/2, the first-type RedCap UE uses the ROs corresponding to each SSBx, where the index of the RO satisfies y mod k=0, and k=⌈Q/M⌉. ⌈Q/M⌉ means rounding up Q/M to the nearest integer. In other words, if Q/M is an integer, k=Q/M; otherwise, k is equal to the integer part of Q/M plus 1. When M is greater than Q/2, the second-type RedCap UE uses the ROs corresponding to each SSBx, where the index of the RO satisfies y mod k=0, and k=⌈K*Q/(K*Q−M)⌉. ⌈K*Q/(K*Q−M)⌉ means rounding up K*Q/(K*Q−M) to the nearest integer. In other words, if K*Q/(K*Q−M) is an integer, k=K*Q/(K*Q−M); otherwise, k is equal to the integer part of K*Q/(K*Q−M) plus 1.

Figure 6:
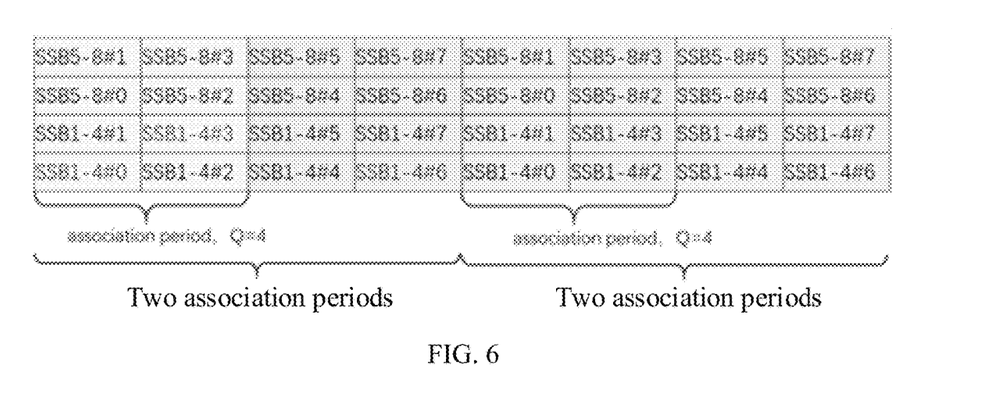
FIG. 6 is a schematic diagram of a discontinuous mapping.

For the second mapping manner, for example, as shown in FIG. 6, Q=4, and when M=5, K=2. The second-type RedCap UE uses SSB1-4 #0, SSB1-4 #3, SSB1-4 #6, SSB5-8 #0, SSB5-8 #3, and SSB5-8 #6. The first-type RedCap UE uses SSB1-4 #1, SSB1-4 #2, SSB1-4 #4, SSB1-4 #5, SSB1-4 #7, SSB5-8 #1, SSB5-8 #2, SSB5-8 #4, SSB5-8 #5, SSB5-8 #7.

At step 102, the RedCap UE type of the RedCap UE is identified based on the RO resources used by the RedCap UE to transmit the Msg1.

In the technical solution of the method for identifying a RedCap UE type provided by this embodiment of the present disclosure, RACH configuration information of RedCap UEs in a cell is broadcast through a broadcast message. The RACH configuration information includes a proportion parameter of available RO resources for different RedCap UE types, such that the RedCap UE transmits Msg1 to the base station by using the RO resources corresponding to its RedCap UE type according to the proportion parameter and its RedCap UE type. The base station identifies the RedCap UE type of the RedCap UE according to the RO resources used by the RedCap UE to transmit the Msg1. In this embodiment of the present disclosure, a proportion parameter is introduced to determine available RO resources for different types of RedCap UEs, and then the RedCap UE type of the RedCap UE is identified according to the RO resources used by the RedCap UE.

Figure 7:
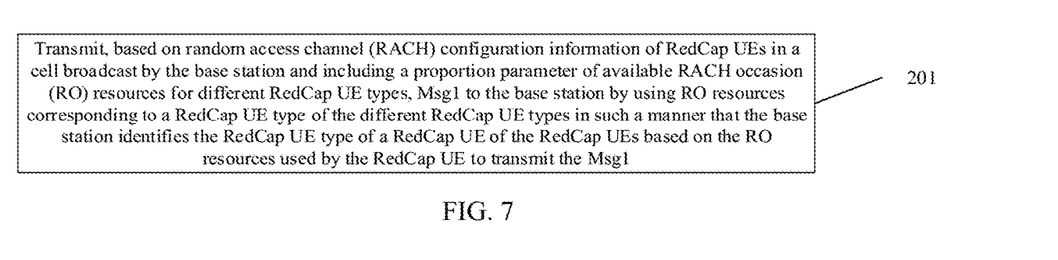
FIG. 7 is a flowchart of a method for identifying a RedCap UE type according to another embodiment of the present disclosure.

FIG. 7 is a flowchart of a method for identifying a RedCap UE type according to another embodiment of the present disclosure. The method is applied to a RedCap UE. As shown in FIG. 7, the method includes step 201.

At step 201, Msg1 is transmit to a base station by using RO resources corresponding to a RedCap UE type based on RACH configuration information of RedCap UEs in a cell broadcast by the base station and including a proportion parameter of available RO resources for different RedCap UE types in such a manner that the base station identifies the RedCap UE type of the RedCap UE based on the RO resources used by the RedCap UE to transmit the Msg1.

In some embodiments of the present disclosure, the different RedCap UE types of RedCap UEs include a first-type RedCap UE and a second-type RedCap UE.

In some embodiments of the present disclosure, a proportion of RO resources used by the first-type RedCap UE is calculated by dividing the proportion parameter by the number of RO resources corresponding to each SSB. A proportion of RO resources used by the second-type RedCap UE is calculated as 1 minus the proportion of RO resources occupied by the first-type RedCap UE.

In the technical solution of the method for identifying a RedCap UE type provided by this embodiment of the present disclosure, Msg1 is transmitted to a base station by using RO resources corresponding to a RedCap UE type based on RACH configuration information of RedCap UEs in a cell broadcast by the base station and including a proportion parameter of available RO resources for different RedCap UE types, in such a manner that the base station identifies the RedCap UE type of the RedCap UE based on the RO resources used by the RedCap UE to transmit the Msg1. In some embodiments of the present disclosure, a proportion parameter is introduced to determine available RO resources for different types of RedCap UEs, and then the RedCap UE type of the RedCap UE is identified based on the RO resources used by the RedCap UE.

Figure 8:
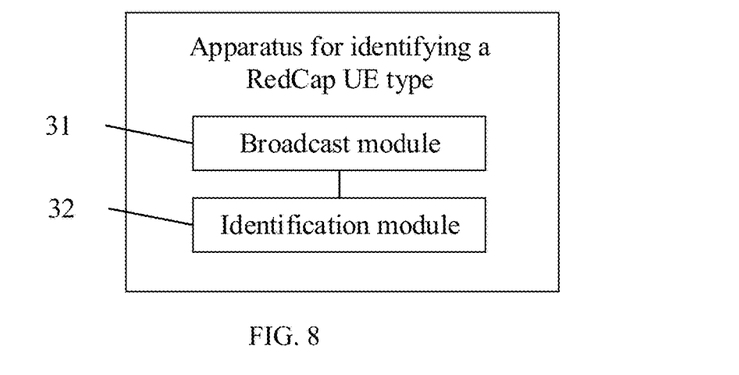
FIG. 8 is a schematic diagram of an apparatus for identifying a RedCap UE type according to an embodiment of the present disclosure.

FIG. 8 is a schematic diagram of an apparatus for identifying a RedCap UE type according to an embodiment of the present disclosure. The apparatus is applied to a base station. As shown in FIG. 8, the apparatus includes a broadcast module 31 and an identification module 32.

The broadcast module 31 is configured to broadcast RACH configuration information, including a proportion parameter of available RO resources for different RedCap UE types, of RedCap UEs in a cell through a broadcast message in such a manner that the RedCap UE transmits, based on the proportion parameter and a RedCap UE type, Msg1 to the base station by using RO resources corresponding to the RedCap UE type.

In some embodiments of the present disclosure, the different RedCap UE types of RedCap UEs include a first-type RedCap UE and a second-type RedCap UE.

In some embodiments of the present disclosure, a proportion of RO resources used by the first-type RedCap UE is calculated by dividing the proportion parameter by the number of RO resources corresponding to each SSB. A proportion of RO resources used by the second-type RedCap UE is calculated as 1 minus the proportion of RO resources occupied by the first-type RedCap UE.

The identification module 32 is configured to identify the RedCap UE type of the RedCap UE based on the RO resources used by RedCap UE to transmit the Msg1.

The apparatus for identifying a RedCap UE type provided by the embodiment of the present disclosure can be used to implement the method for identifying a RedCap UE type in FIG. 1. Detailed description can refer to the foregoing embodiments of the method for identifying a RedCap UE type, which will not be described herein.

For example, the apparatus for identifying a RedCap UE type may be a chip, a chip assembly, or a part of a chip assembly.

In the technical solution of the apparatus for identifying a RedCap UE type provided by the embodiment of the present disclosure, RACH configuration information, including a proportion parameter of available RO resources for different RedCap UE types, of RedCap UEs in a cell is broadcast through a broadcast message in such a manner that the RedCap UE transmits Msg1 to the base station by using the RO resources corresponding to its RedCap UE type based on the proportion parameter and its RedCap UE type. The base station identifies the RedCap UE type of the RedCap UE based on the RO resources used by the RedCap UE to transmit the Msg1. In the embodiment of the present disclosure, the proportion parameter is introduced to determine available RO resources for different types of RedCap UEs, and then the RedCap UE type of the RedCap UE is identified based on the RO resources used by the RedCap UE.

Figure 9:
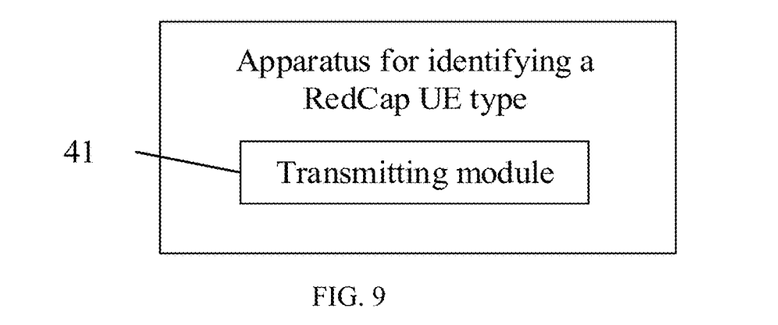
FIG. 9 is a schematic diagram of an apparatus for identifying a RedCap UE type according to another embodiment of the present disclosure.

FIG. 9 is a schematic diagram of an apparatus for identifying a RedCap UE type according to another embodiment of the present disclosure. The apparatus is applied to a RedCap UE. As shown in FIG. 9, the apparatus includes a transmitting module 41.

The transmitting module 41 is configured to transmit Msg1 to a base station by using RO resources corresponding to a RedCap UE type based on RACH configuration information, including a proportion parameter of available RO resources for different RedCap UE types, of RedCap UEs in a cell broadcast by the base station in such a manner that the base station identifies the RedCap UE type of the RedCap UE based on the RO resources used by the RedCap UE to transmit the Msg1.

In some embodiments of the present disclosure, the different RedCap UE types of RedCap UEs include a first-type RedCap UE and a second-type RedCap UE.

In some embodiments of the present disclosure, a proportion of RO resources used by the first-type RedCap UE is calculated by dividing the proportion parameter by the number of RO resources corresponding to each SSB. A proportion of RO resources used by the second-type RedCap UE is calculated as 1 minus the proportion of RO resources occupied by the first-type RedCap UE.

The apparatus for identifying a RedCap UE type provided by the embodiment of the present disclosure can be used to implement the method for identifying a RedCap UE type in FIG. 7. Detailed description can refer to the foregoing embodiments of the method for identifying a RedCap UE type, which will not described herein.

For example, the apparatus for identifying a RedCap UE type may be a chip, a chip assembly, or a part of a chip assembly.

In the technical solution of the apparatus for identifying a RedCap UE type provided by the embodiments of the present disclosure, Msg1 is transmitted to the base station by using the RO resources corresponding to the RedCap UE type based on RACH configuration information, including a proportion parameter of available RO resources for different RedCap UE types, of RedCap UEs in a cell broadcast by the base station in such a manner that the base station identifies the RedCap UE type of the RedCap UE based on the RO resources used by the RedCap UE to transmit the Msg1. In the embodiment of the present disclosure, the proportion parameter is introduced to determine available RO resources for different types of RedCap UEs, and then the RedCap UE type of the RedCap UE is identified based on the RO resources used by the RedCap UE.

The apparatuses and products described in the embodiments shown in FIG. 8 to FIG. 9 include modules/units, which can be software modules/units, hardware modules/units, or partially software modules/units and partially hardware modules/units. For example, for various apparatuses or products applying or integrating chips, the modules/units can be implemented using hardware such as circuits, or at least some modules/units can be implemented using software programs running on the integrated processor inside the chip, while the remaining (if any) modules/units can be implemented using hardware such as circuits. For various apparatuses or products applying or integrating chip assemblies, the modules/units can be implemented using hardware such as circuits. Different modules/units can be located within the same component (e.g., chip or circuit module) of the chip assembly or in different components. At least some modules/units can be implemented using software programs running on the integrated processor inside the chip assembly, while the remaining (if any) modules/units can be implemented using hardware such as circuits. For various apparatuses or products applying or integrating terminals, the modules/units can be implemented using hardware such as circuits. Different modules/units can be located within the same component (e.g., chip or circuit module) of the terminal or in different components. Alternatively, at least some modules/units can be implemented using software programs running on the integrated processor inside the terminal, while the remaining (if any) modules/units can be implemented using hardware such as circuits.

Figure 10:
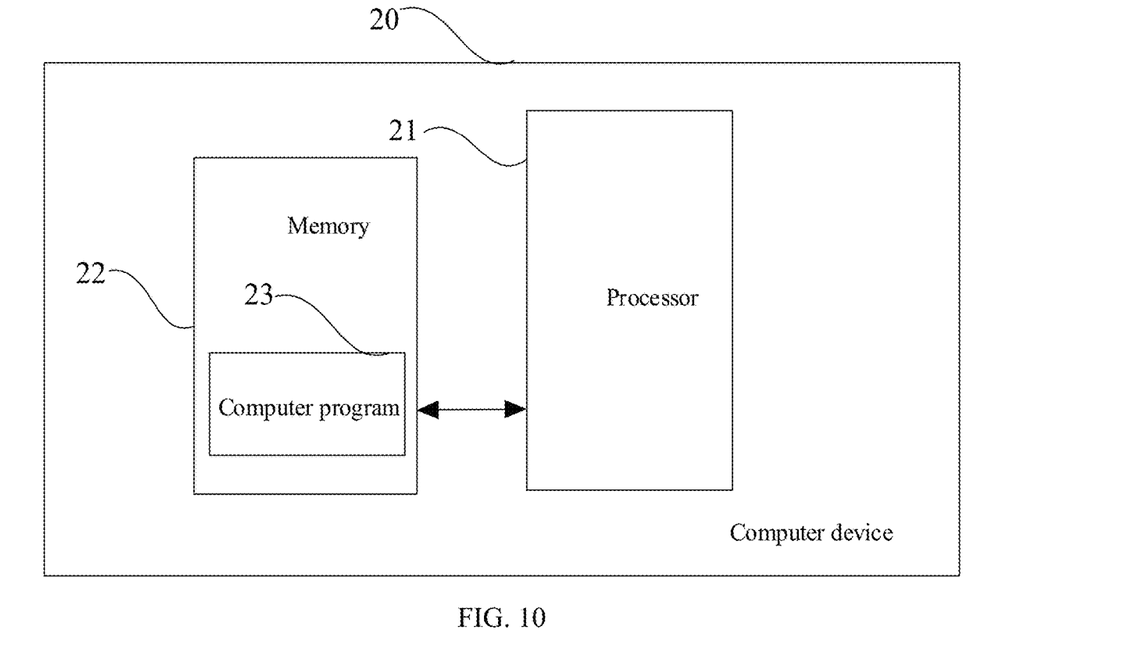
FIG. 10 is a schematic diagram of a computer device according to an embodiment of the present disclosure.

FIG. 10 is a schematic diagram of a computer device according to an embodiment of the present disclosure. As shown in FIG. 10, the computer device 20 in the embodiment includes a processor 21, a memory 22, and a computer program 23 stored on the memory 22 and capable of running on the processor 21. The computer program 23, when executed by the processor 21, implements the method for identifying a RedCap UE type described in the embodiments. To avoid repetition, details will not be repeated herein. Alternatively, when executed by the processor 21, the computer program implements the functionalities of various models/units in the apparatus for identifying a RedCap UE type described in the embodiments. To avoid repetition, details will not be repeated herein.

In some embodiments of the present disclosure, the computer device 20 includes a UE or a base station.

When the computer device 20 includes a UE, the computer device 20 includes the apparatus for identifying a RedCap UE type shown in FIG. 9.

When the computer device 20 includes a base station (gNB), the computer device 20 includes the apparatus for identifying a RedCap UE type shown in FIG. 8.

The computer device 20 includes, but is not limited to, a processor 21 and a memory 22. Those skilled in the art can understand that FIG. 10 shows only an example of the computer device 20, which does not constitute a limitation to the computer device 20, and may include more or fewer components than those shown in the figure. Alternatively, components may be combined, or different components may be used. For example, the computer device may further include input and output devices, a network access device, and a bus.

The processor 21 may be a central processing unit (CPU), or may be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor may also be any conventional processor.

The memory 22 may be an internal storage unit of the computer device 20, such as a hard disk or an internal memory of the computer device 20. The memory 22 may alternatively be an external storage device of the computer device 20, such as a plug-in hard disk, a smart media card (SMC), a secure digital (SD) card, or a flash card that is equipped on the computer device 20. Further, the memory 22 may also include both an internal storage unit and an external storage device of the computer device 20. The memory 22 is configured to store the computer program and other programs and data required by the computer device. The memory 22 may also be configured to temporarily store data that has been outputted or will be outputted.

A person skilled in the art can clearly understand that, for convenience and brevity of description, reference may be made to corresponding processes in the foregoing method embodiments for specific working processes of the foregoing apparatuses and units. Details are not described herein again.

In the several embodiments provided in the present disclosure, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual needs to achieve the objectives of the solutions of the embodiments of the present disclosure.

The functional units in the embodiments of the present disclosure may be integrated into one processing unit, or each of the units may exist alone physically, or two or more units are integrated into one unit. The integrated unit may be implemented in a form of hardware, or may be implemented in a form of hardware plus software functional units.

The integrated unit implemented in the form of a software functional unit may be stored in a computer-readable storage medium. The software functional unit is stored in a storage medium and includes instructions to cause a computer device (which may be a personal computer, a server, a network apparatus, or the like) or a processor to perform some of the steps of the methods described in the embodiments of the present disclosure. The foregoing readable storage medium includes: any medium that can store program codes, such as a USB flash disk, a removable hard disk, a read-only memory (ROM), a random access memory (RAM), a magnetic disk, or an optical disc.

The above descriptions are merely some embodiments of the present disclosure and are not intended to limit the present disclosure. Any modification, equivalent replacement and improvement within the spirit and principle of the present disclosure shall be included within the protection scope of the present disclosure.

What is claimed is:

1. A method for identifying a reduced capability (RedCap) user equipment (UE) type, comprising:
   transmitting, based on random access channel (RACH) configuration information of RedCap UEs in a cell broadcast by the base station and comprising a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1.

2. The method according to claim 1, wherein the different RedCap UE types of RedCap UEs comprise a first-type RedCap UE and a second-type RedCap UE.

3. The method according to claim 1, wherein a proportion of RO resources used by a first-type RedCap UE is M/KQ; and
   a proportion of RO resources used by a second-type RedCap UE is (KQ−M)/KQ,
   where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠nQ, and n is a positive integer.

4. The method according to claim 3, wherein the RO resources are allocated to the RedCap UEs based on the proportion parameter in a first mapping manner or a second mapping manner.

5. The method according to claim 4, wherein the first mapping manner comprises a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

6. The method according to claim 4, wherein the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner;
  in a case where M is smaller than or equal to Q/2, the index of the RO corresponding to each SSBx that is used by the first-type RedCap UE satisfies y mod k=0, and k=⌈Q/M⌉; and
  in a case where M is greater than Q/2, the index of the RO corresponding to each SSBx that is used by the second-type RedCap UE satisfies y mod k=0, and k=⌈K*Q/(K*Q−M)⌉.

7. A user equipment (UE), comprising a processor, a memory, and a computer program stored on the memory, wherein the computer program, when executed by the processor, cause the processor to:
  transmit, based on random access channel (RACH) configuration information of RedCap UEs in a cell broadcast by the base station and comprising a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1.

8. The UE according to claim 7, wherein the different RedCap UE types of RedCap UEs comprise a first-type RedCap UE and a second-type RedCap UE.

9. The UE according to claim 7, wherein a proportion of RO resources used by a first-type RedCap UE is M/KQ; and
  a proportion of RO resources used by a second-type RedCap UE is (KQ−M)/KQ,
  where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠nQ, and n is a positive integer.

10. The UE according to claim 9, wherein the RO resources are allocated to the RedCap UEs based on the proportion parameter in a first mapping manner or a second mapping manner.

11. The UE according to claim 10, wherein the first mapping manner comprises a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

12. The UE according to claim 10, wherein the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner;
  in a case where M is smaller than or equal to Q/2, the index of the RO corresponding to each SSBx that is used by the first-type RedCap UE satisfies y mod k=0, and k=⌈Q/M⌉; and
  in a case where M is greater than Q/2, the index of the RO corresponding to each SSBx that is used by the second-type RedCap UE satisfies y mod k=0, and k=⌈K*Q/(K*Q−M)⌉.

13. A non-transitory computer readable medium, storing program codes, wherein the program codes, when executed by a processor, cause the processor to:
  transmit, based on random access channel (RACH) configuration information of RedCap UEs in a cell broadcast by the base station and comprising a proportion parameter of available RACH occasion (RO) resources for different RedCap UE types, Msg1 to the base station by using RO resources corresponding to a RedCap UE type of the different RedCap UE types in such a manner that the base station identifies the RedCap UE type of a RedCap UE of the RedCap UEs based on the RO resources used by the RedCap UE to transmit the Msg1.

14. The non-transitory computer readable medium according to claim 13, wherein the different RedCap UE types of RedCap UEs comprise a first-type RedCap UE and a second-type RedCap UE.

15. The non-transitory computer readable medium according to claim 13, wherein a proportion of RO resources used by a first-type RedCap UE is M/KQ; and
  a proportion of RO resources used by a second-type RedCap UE is (KQ−M)/KQ,
  where M denotes the proportion parameter, Q denotes a number of ROs corresponding to each synchronization signal block (SSB) in an association period among the RO resources, KQ denotes a number of ROs corresponding to each SSB in K association periods, K=⌈M/Q⌉, M≠nQ, and n is a positive integer.

16. The non-transitory computer readable medium according to claim 15, wherein the RO resources are allocated to the RedCap UEs based on the proportion parameter in a first mapping manner or a second mapping manner.

17. The non-transitory computer readable medium according to claim 16, wherein the first mapping manner comprises a continuous mapping which is in units of K association periods, the first-type RedCap UE uses first M ROs of the KQ ROs corresponding to each SSB, and the second-type RedCap UE uses (M+1)-th to KQ-th ROs of the KQ ROs corresponding to each SSB.

18. The non-transitory computer readable medium according to claim 16, wherein the second mapping manner is a discontinuous mapping which is in units of K association periods, SSBx #y denotes a y-th RO corresponding to an x-th SSB, y is an index of an RO corresponding to SSBx, y=0, 1 . . . , K*Q−1, and y is numbered in a frequency-domain-first, time-domain-second manner;
  in a case where M is smaller than or equal to Q/2, the index of the RO corresponding to each SSBx that is used by the first-type RedCap UE satisfies y mod k=0, and k=⌈Q/M⌉; and
  in a case where M is greater than Q/2, the index of the RO corresponding to each SSBx that is used by the second-type RedCap UE satisfies y mod k=0, and k=⌈K*Q/(K*Q−M)⌉.

* * * * *